Nov. 5, 1957  W. W. CHATFIELD  2,812,108
MATERIAL DISTRIBUTING DEVICE
Filed Jan. 13, 1955  3 Sheets-Sheet 2
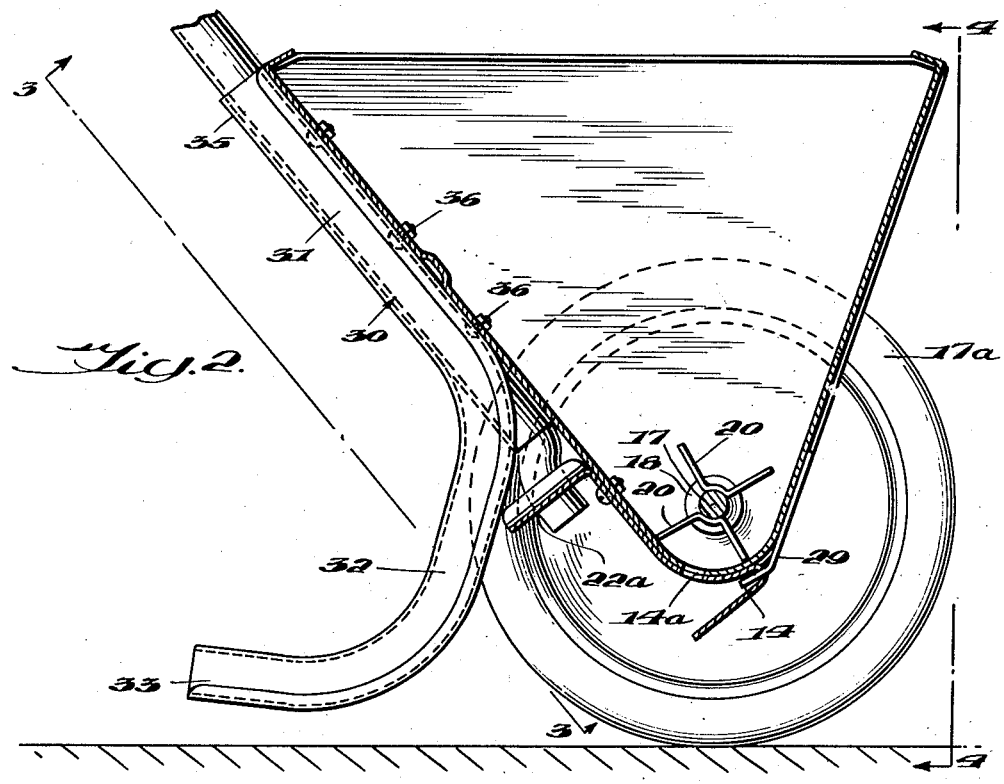
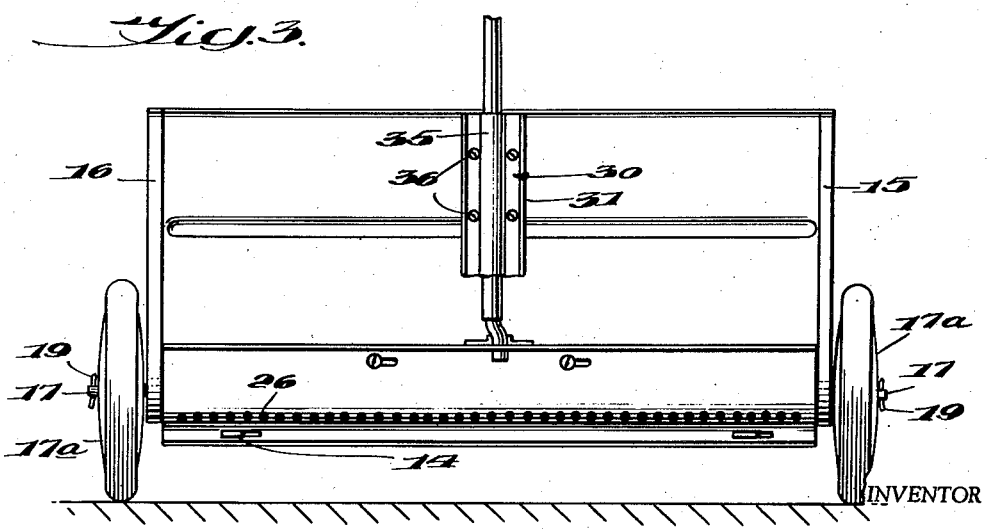
INVENTOR
WILLIAM W. CHATFIELD,
BY Hall & Houghton
ATTORNEY

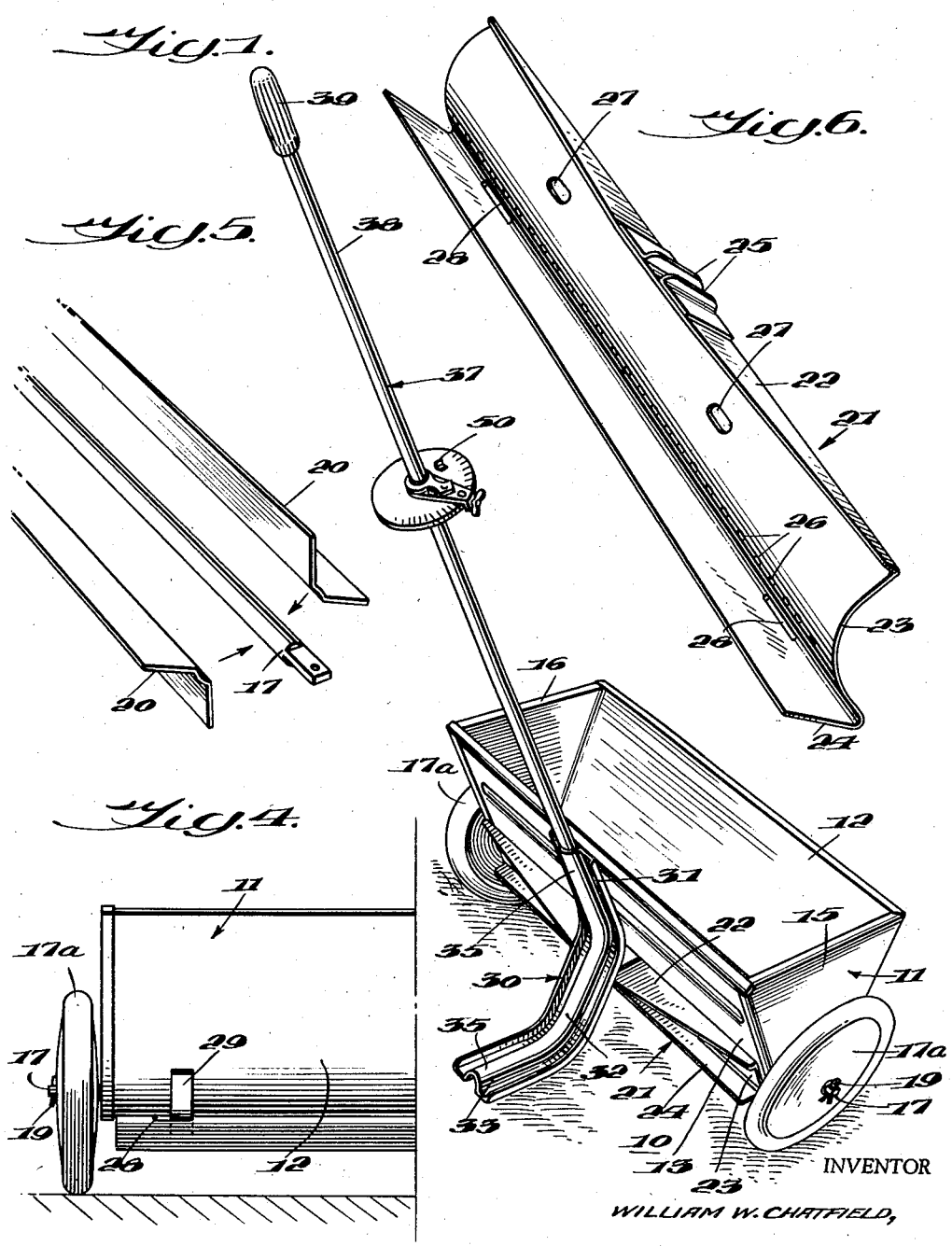

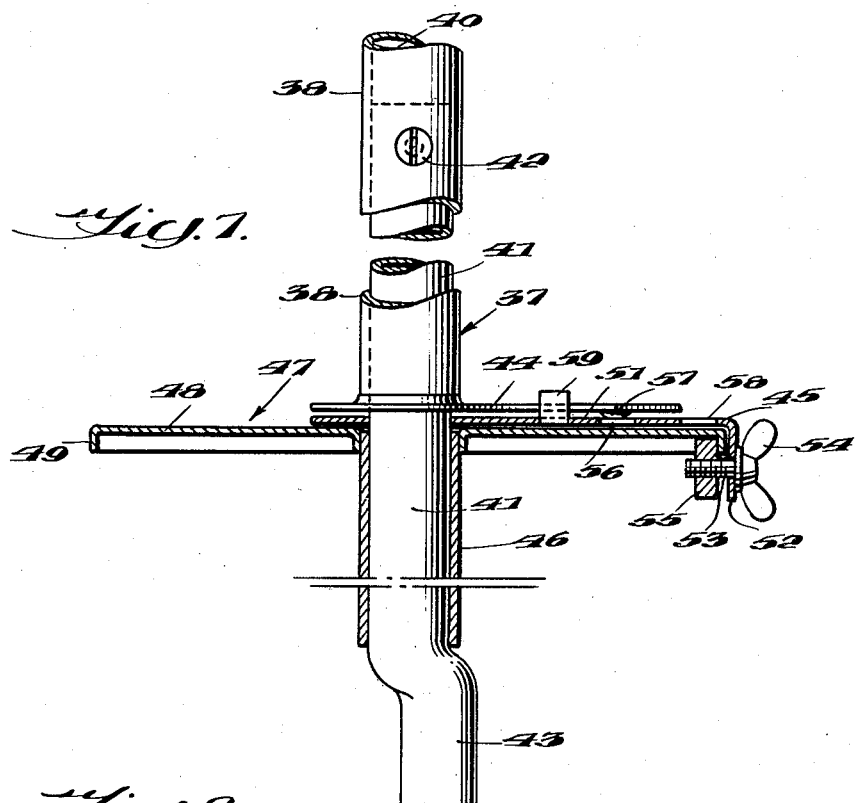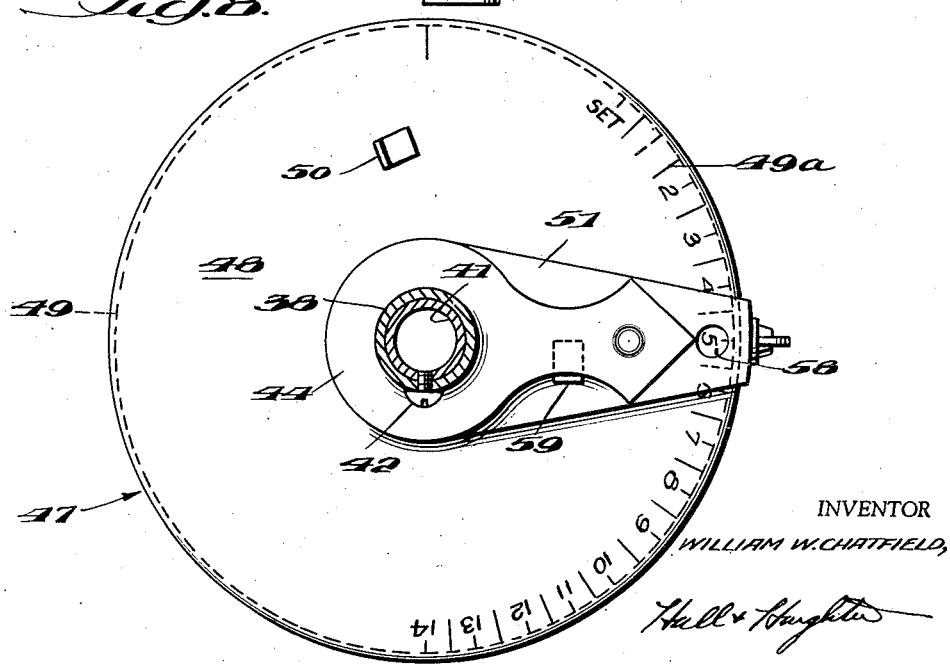

United States Patent Office 2,812,108
Patented Nov. 5, 1957

2,812,108

MATERIAL DISTRIBUTING DEVICE

William W. Chatfield, Huntington, W. Va., assignor to Armstrong Products Corporation, Huntington, W. Va., a corporation of West Virginia Application January 13, 1955, Serial No. 481,504

12 Claims. (Cl. 222—41)

The present invention relates to a material distributing device, and more particularly to a device of the hand-propelled type for discharging or spreading seed, fertilizer, lime, soil conditioner, and other related fluent solid materials in a controlled manner from a hopper.

There are a wide variety of material distributing devices or agricultural spreaders in use today for distributing or sowing seed, fertilizer, lime, and like materials on the ground. These prior spreaders, while generally useful, possess one or more disadvantages which are objectionable to the user of any particular spreader. For example, the control mechanisms for the rate of distribution of the material do not give an accurate feed control. Moreover, such prior controls do not possess an ease of adjustment in changing from one setting to another. Further, many of the control mechanisms quite often, due to their construction, freeze or stick as a result of moisture and rust. Still another disadvantage of many of the prior spreaders is the lack of strong support means for the spreader when it is loaded and at a standstill. One such typical support employed heretofore has been the use of an angled leg and foot member secured at one end to the handle, which oftentimes resulted, when the spreader is loaded, in a bending of the support leg. Still another disadvantage with the prior spreaders is the lack of strength in the connection of the handle to the hopper, which shortens the useful life of the instrument.

A great many of the prior spreaders are also objectionable for the reason that the gate mechanism has a tendency to sag, thus improperly shutting or closing off the discharge openings in the hopper. This oftentimes results in a leakage of the material being distributed, even though the discharge openings are supposed to be in a closed state. This condition results in an unnecessary waste of the material, which is undesirable, particularly when using materials of a high cost. Also a great many of the prior devices have not resulted in a uniform distribution of the material, due in part to the agitating means for maintaining the material to be distributed in a state of motion, as well as the discharge opening construction.

It is therefore a principal object of the present invention, in eliminating the foregoing and related disadvantages, to provide a material distributing device or spreader which is of a new and improved construction.

Another object of the present invention is the provision of a spreader having a feed control setting that is extremely easy to operate and is quite accurate in control.

Still another object of the present invention is the provision of a spreader having a feeding mechanism that will insure proper and uniform feeding of the material from the hopper at all times without any tendency to bind.

Still another object of the present invention is the provision of a spreader having a support construction that is extremely sturdy and will maintain the spreader in a rigid supported state when loaded.

Another object of the present invention is the provision of a control mechanism that will remain in sealed relationship with the discharge end of the hopper when in a closed position, thus eliminating any leakage of the material to be distributed.

A further object of the present invention is the provision of a spreader having an improved agitating device which, in combination with the other elements of the spreader, insures a more even distribution of the material.

A still further object of the present invention is the provision of a spreader that is extremely rugged in construction.

Other and additional objects will become manifest from the ensuing description taken in conjunction with the accompanying drawings.

Broadly stated, the spreader made in accordance with the present invention comprises a hopper, a shaft rotatable in the hopper, agitating means carried by said shaft longitudinally thereon at right angles thereto, said hopper having a plurality of discharge ports along the bottom edge thereof, gate means secured to the back face of said hopper in lateral slidable engagement therewith, said gate having a plurality of openings adapted to align with the openings in the hopper when the gate is opened, and out of alignment when the gate is closed, handle means secured at one end to the upper end of said gate to move said gate laterally, support means secured to the back face of said hopper, said support means having a longitudinal opening therethrough for receiving and retaining said handle means, said support means having, preferably formed integral therewith, an angled leg member extending outwardly therefrom for supporting the spreader, and dial means carried by said handle, said dial means being provided with a plurality of settings by which the lateral movement of said gate means is controlled.

To the accomplishment of the foregoing and related ends, the present invention then consists of the means hereinafter fully described and particularly pointed out in the claims, the annexed drawings and the following description setting forth in detail certain means in the carrying out of the invention, such disclosed means illustrating, however, but one of various ways in which the principle of the invention may be employed.

The present invention is illustrated by way of example in the accompanying drawings, in which—

Figure 1 is a perspective of an illustrative embodiment of a spreader or material distributing device made in accordance with the present invention.

Fig. 2 is a side elevation partly in cross section of the spreader shown in Fig. 1.

Fig. 3 is a rear elevation of the spreader shown in Fig. 1 with the foot portion being removed, as shown by lines 3—3 of Fig. 2.

Fig. 4 is a fragmentary front elevation, as shown by lines 4—4 of Fig. 2, illustrating means for maintaining the gate in proper position.

Fig. 5 is an exploded perspective view of the agitator blade mechanism in a disassembled condition.

Fig. 6 is a perspective enlarged view of the gate mechanism shown in Fig. 1.

Fig. 7 is an enlarged view partly in cross section of the feed control setting means and the handle construction.

Fig. 8 is a top plan view partly in cross section of the control mechanism shown in Fig. 7.

Referring now to the drawings, and with particular reference to Figs. 1 and 2, an illustrative embodiment of a spreader or material distributing device made in accordance with the present invention and generally designated by reference numeral 10 is shown. The spreader 10 has a hopper 11 comprising front and rear portions 12 and 13 which converge and unite with one another in integral relationship at one end thereof forming a curved arcuate bottom portion 14. A plurality of spaced openings 14a are provided in the bottom arcuate member 14, and will function as the discharge means for the hopper 11, as will be described more fully hereinafter. The hopper 11 is provided with triangular shaped side members 15 and 16, which are secured to the respective free side ends of the front and rear portions 12 and 13 by any suitable means, such as, for example, welding and the like, to complete the formation of the hopper. This construction results in the hopper 11 having a large rectangular opening in its upper end, and a small arcuate end at its bottom. To provide strength and to facilitate the securing of the component parts of the hopper 11, each of the upper free ends of the side members 15 and 16 and the front and rear portions 12 and 13 may be provided with inwardly turned flange portions. The hopper may be made of any suitable material, such as, for example, sheet metal, and may be of any desired gauge, dependent upon the size and capacity of the hopper.

A shaft 17 is journaled for rotation in an aligned opening formed in each of the side members 15 and 16 adjacent the arcuate end member 14 of the hopper 11. Wheels 17a are secured in driving relationship to each free end of shaft 17 extending outwardly on each side of the hopper 11, and the shafts run in bearings 18 to provide easier rotation. The wheels 17a are held in place by means of a cotter pin 19 extending through the opening formed in each free end of the shaft 17.

The shaft 17 is provided with a pair of elongated agitating blade members 20 (see Fig. 5) integrally secured on opposite sides thereof which will rotate with the shaft when the spreader 10 is placed in motion. The agitator blade members 20 are formed of light gauge sheet metal, and each comprises an elongated, slightly arcuate center portion of a length slightly less than that of the hopper 11 and conforming to the curvature of the shaft 17. A pair of wing portions are secured to the opposite edges of the center portion at approximately right angles thereto. When each agitator blade member 20 is secured to the shaft 17 by placing the undersurface of the arcuate center section of each on opposite sides of the shaft 17 and welded or otherwise secured thereto, four elongated agitating blades will be formed along the entire length of the shaft 17, with each blade being substantially at right angles with respect to the adjoining blades. When the spreader 10 is in use, the agitator blades will be in motion, thus placing the material to be discharged in the lower end of the hopper in a state of agitation which will prevent "packing" or "channeling," and result in a constant, even amount of material being placed at the discharge openings 17a of the hopper 11 for distribution.

Gate means 21 (see Fig. 6), which functions as a valve mechanism for controlling the rate of discharge of the material through the openings 14a, is secured along the outside face of the rear member 13 of the hopper 11 adjacent its lower end. The gate means 21 comprises a top member 22 secured in angled relationship to an arcuate central body portion 23. The central body portion 23 is shaped to fit against the lower outer surface of the rear member 13 of the hopper 11, and curved around to engage the arcuate bottom member 14. The opposite free end of the central body portion 23 is curved back and upon itself to a degree forming a bottom portion 24. This construction results in the top member 22 extending outwardly at substantially right angles to the rear member 13, with the bottom member 24 lying substantially parallel to the top member 22, but being spaced downwardly and inwardly recessed therefrom. The positioning of the rear member 24 is such that it will lie below the discharge openings 14a of the hopper 11 with its free end extending beyond and in angular relationship to the line of fall of the material discharged from the hopper. This function will be described more fully hereinafter.

The top member 22 is provided with a centrally positioned opening 22a and flange members 25 secured thereon on either side of such opening. Each of the flange members, in the form shown, is secured along its respective bottom surface by welding or the like to the top member 22 with their flange portions immediately extending upwardly on either side of the opening 22a. The central body member 23 is provided with a plurality of openings 26 of the same spacing as the openings 14a in the arcuate bottom member 14 of the hopper 11. The central body portion 23 is provided with a pair of spaced slots 27 by which the gate means 21 is slidably secured to the hopper 11 through nut and bolt means 27a. The nut and bolt means 27a is of suitable type, say the head-and-shouldered bolt type, to enable the gate means 21 to be shifted laterally, in a manner more fully described hereinafter, to bring the openings 26 into and out of alignment with the discharge openings 14a to provide the feed rate control from the hopper 11.

The portion of the center portion 23 along the line of bend by which the rear member 24 is formed is provided with spaced slots 28, each being adapted to receive therein an angled strap member 29 (see Fig. 4). Each angled strap member 29 is secured by welding or the like to the front face of the front member 12 of the hopper 11 adjacent to and in alignment with the openings 28. The forward free end of each strap 29 is angularly bent and is positioned within the slot 28 of the rate means 21. The function of the strap 29 is to maintain the gate means 21 up at all times to thus insure a tight engagement of the gate means 21 against the arcuate member 14 of the hopper 11, thereby providing a positive seal and eliminating leakage of any material to be distributed therefrom.

Support means 30 is secured to the back face of the rear member 13 of the hopper 11 above and in alignment with the opening 22a of the top member 22 of the gate means 21. The function of the support means 30 is to provide the necessary support for retaining the spreader 10 in substantially upright relationship when not in use as well as functioning as a support and guide means for the handle mechanism. The support means 30 comprises an upper portion 31 secured to the back face of the rear member 13 of the hopper 11 by means of nuts and bolts 36. The upper portion 31 extends from the upper free end of the rear member 13 of the hopper 11 downwardly, and is in axial alignment with the opening 22a of the gate means 21. The central portion 32 of the support means 30 is bent outwardly and away from the hopper 11 so as to clear slightly the forward free end of the top member 22 of the gate means 21. The free end of the central portion 32 is bent outwardly further to provide a foot portion 33 which will engage the ground when the spreader 10 is at rest to support same.

In the illustrative embodiment of the support means 30, it is preferred that it be a double channel construction in which the channel members are joined by a central arcuate portion 35 resulting in a design that is generally W-shaped in cross section. The central arcuate bridging portion 35 will be in vertical or axial alignment with the opening 22a of the gate means 21, and as shown, extends the entire length of the support means 30. It is to be understood that the central portion 32 of the foot portion 33 need not have the central arcuate bridge portion 35 extending therethrough, but can be U-shaped in cross section with the arcuate central portion 35 being in a flat state.

Handle means 37 are secured to the hopper 11 by means of the support means 30 and the gate means 21. The handle means 37 comprises an upper handle member 38 having a hand grip 39 secured to its upper free end. The upper handle member 38 has an axial bore 40 extending therethrough into which the upper free end of the lower handle member 41 is positioned and held in tight engagement by means of a set screw 42. The opposite free end of the lower handle member is provided with an offset camming member 43 which passes through the opening 22a and between and in engagement with the angled members 25. The camming member 43 functions, when actuated, to slide the gate means 21 laterally, as will be described more fully hereinafter.

The bottom free end of the upper handle member 38 is provided with a fixed index pointer 44 which will rotate directly with the upper handle member 38. Immediately below the index pointer 44 are dial face means 45 secured to the upper free end of outside collar pipe 46 extending downwardly therefrom and enveloping or encasing the lower handle member 41 in movable relationship therewith. The collar pipe 46 extends down through the arcuate bridging portion 35 of the support means 30, and terminates below the point of bend of the top portion 31 and the central portion 32.

The index pointer 44 in combination with the dial face 45 cooperates to form the dial means 47 by which the rate of feed of the material to be distributed can be controlled. This is accomplished by having the upper handle member 38, the lower handle member 41, and the index pointer 44 rotatable with respect to the fixed outside collar member 46 and the dial face 45. The dial means 47 comprise a circular face member 48 having a downwardly turned peripheral flange 49 extending therearound. The circular face member 48 is provided adjacent its outside peripheral edge with a plurality of calibrated numerals or numbers 49a, which will determine any particular rate of feed of the material. The face member 48 is provided with a stop member 50 so positioned that when the index pointer 44 is at a zero setting, the side edge of the index pointer will rest against the stop member 50.

A calibrating arm 51 is mounted for free rotation around the lower handle member 41, and will rest between the face member 48 and the bottom surface of the index pointer 44. The opposite free end of the calibrating arm 51 is flanged downwardly at a point just beyond the circumferential edge of the face member 48, thereby forming a flange member 52 which will lie in parallel relationship to and extend below the bottom edge of the peripheral flange portion 49 of the face member 48. The flange member 52 is provided with an opening 53 positioned just below the free end of the flanged portion 49 of the face 48. A winged lock nut 54 extends inwardly through the opening 53, and is to receive a square nut 55 which will, in part, rest against the inner face of the peripheral flange portion 49 of the face 48. This construction is the means by which the calibrating arm 51 can be moved to any particular one of the calibrated numerals 49a, as will be described more fully hereinafter in the operation of the spreader.

The calibrating arm 51 is provided with a locking opening 56 for receiving the detent 57 positioned on the underface of the index pointer 44 when the index pointer 44 and the calibrating arm 51 are in alignment. The forward free end of the calibrating arm 51 is provided with a dial opening 58 therein which will disclose the particular calibrated numbers 49a at which arm 51 is set. The calibrating arm 51 is provided with a stop member 59 to prevent the movement of the index pointer 44 beyond a particular setting of the calibrating arm 51.

In the operation of the illustrative embodiment of the agricultural spreader made in accordance with the present invention, the handle 37 is turned so that the index pointer 44 will register a zero setting. This results in the gate means 21 sliding laterally by means of the offset camming member 43 of the bottom handle member 41 engaging the flange members 25 carried by the gate means 21. The material to be distributed is loaded into the hopper 11, and the dial means 47 are then adjusted to give the desired rate of feed for the particular material to be distributed. The dial means 47 are set by first selecting a particular calibrated numeral 49a on the face 48 which will give the desired feed rate. The winged lock nut 54 carried by the flange member 52 of the calibrating arm 51 is loosened and the calibrating arm 51 rotated around the lower handle member 41 until the dial opening 58 coincides with the selected calibrated numeral 49a. The winged lock nut 54 is then tightened with the square nut locking against the inner surface of the flange portion 49 of the face member 48.

The material is distributed or sown by turning the upper handle member 38 until the index pointer 44 strikes the stop member 59. This action results in the detent 57 snapping into locked engagement with the opening 56 in the calibrating arm 51, thus placing the index pointer 44 in locked alignment with the selected calibrating numeral 49a appearing on the dial opening 58 of the calibrating arm 51. Similarly, this action results in the lower handle member 41 rotating, causing the offset camming member 43 to move against the flange members 25, thus causing the gate means 21 to slide laterally, resulting in the openings 26 coming into partial alignment with the openings 14a of the hopper 11 corresponding to the selected dial setting.

The spreader 10 is then pushed by hand causing the wheels 17a to rotate the shaft 17, which, in turn, rotates the agitating blade members 20. This action results in the material to be distributed being agitated and moved through the discharge openings 14a and through the openings 26 of the gate means 21. The material falling through the openings as determined by the dial means 47 passes downwardly striking the angled surface of the bottom portion 24 of gate means 21. This will result in the distributed material falling into the ground from the angled face of the foot portion 33 in an even, constant manner, thus insuring a proper distribution of the material. To stop the machine from feeding when the spreader 10 is to be turned around for additional distribution of the material in an adjoining row, the upper handle member 38 is rotated to bring the index pointer 44 in alignment with the zero setting of the dial face member 48. This results in the gate means 21 moving laterally in a manner as hereinbefore described, and shutting off or closing the discharge openings 14a of the hopper 11. An important feature of the present invention in connection with the opening and closing of the gate means 21 and the discharge openings 14a of the hopper 11 is the association of the angled strap member 29 with the gate means 21. The strap member 29 supports and prevents any dropping or tendency to sag of the gate means 21 after the spreader 10 has been in repeated use, a tendency that is common with the present day spreading devices.

It is to be understood that the particular form of spreader shown and described herein is presented for purposes of explanation and illustration, and that various modifications are readily apparent without departing from the spirit and scope of the invention disclosed herein and as defined in the appended claims.

I claim:

1. A material distributing device having a wheeled hopper with an agitator therein and a plurality of discharge ports along the bottom thereof, and having a gate means movable laterally of said hopper for covering and uncovering said discharge ports, and crank means for operating said gate means; said gate means comprising a ported body portion and a top portion secured to said body portion in angular relationship thereto, said top portion being provided with an opening to receive the bottom end of said crank means and with angled members positioned on each side of the opening in the top portion of the gate means extending at right angles thereto.

2. A material distributing device of the type comprising a wheeled hopper having an agitator therein, laterally movable gate means at the bottom thereof, and handle means therefor, in which said handle means comprising a top handle section having a central bore therein, a bottom handle section detachably positioned within said bore to said handle in axial alignment therewith, and index pointer means fixedly secured to the bottom free end of said top handle section, a collar pipe enveloping a portion of said bottom handle section below said index pointer means, a dial face having calibrated numbers thereon secured to the top free end of said collar pipe in operable relationship with said index pointer, and actuating means carried by the lower end of said bottom handle section for engaging the upper end of said gate means whereby said top and bottom handle sections are rotatable with respect to said dial face means and collar means for controlling the lateral movement of said gate means with respect to the hopper.

3. A material distributing device in accordance with claim 2 wherein calibrating means is rotatably mounted on said bottom handle section between said index pointer means and said dial face means, said calibrating means being rotatable about the top surface of said dial face means, means to lock said calibrating means at any desired point to said dial face means, and stop means to prevent the rotation of the index pointer means beyond the setting determined by the calibrating means when locked in position to said dial face.

4. A material distributing device in accordance with claim 2 wherein said actuating means comprises an integral offset shoulder section of said bottom handle means, said offset shoulder section being just below the bottom free end of said collar pipe.

5. A material distributing device in accordance with claim 2, further comprising support means for securing said collar pipe to said hopper, which support means comprises a top section secured to the back face of said hopper at a point above the gate means, said top section clamping said collar pipe to said hopper, a central section secured to the bottom free end of said top section in angular relationship thereto, and a foot section secured to said central section in angled relationship thereto, said foot section to engage the ground and maintain the hopper in substantially upright position.

6. A material distributing device in accordance with claim 5 wherein the top section of said support means is a double channel member united to one another by an arcuate central portion.

7. The combination, with a material distributing device of the type comprising a wheeled hopper having an agitator therein and a plurality of discharge ports along the bottom thereof with gate means movable laterally of said hopper for covering and uncovering said discharge ports, of means for propelling said distributing device and operating said gate means comprising a sleeve, means securing said sleeve to said hopper, a single handle rotatably mounted in said sleeve, said handle being secured against longitudinal displacement from said sleeve to enable it to be employed for propelling the distributing device, means for moving said gate means laterally of said hopper in response to rotation of said single handle in said sleeve, interengageable stop means carried by said handle and sleeve for stopping rotation of said handle in one direction with said gate means in covering relation to said discharge ports, and adjustable interengageable stop means carried by said handle and sleeve, for stopping rotation of said handle in the other direction with said gate means uncovering said discharge ports to an extent determined by the setting of said adjustable stop means.

8. A combination according to claim 7, said single handle comprising a shaft portion for extending through said sleeve and a top handle section embracing and secured to said shaft portion for rotation therewith, a dial carried by the upper end of said sleeve, and a pointer contiguous to said dial and carried by and rotatable with said top handle section, said interengaging stop means comprising said pointer and an abutment member projecting upwardly from said dial, and said adjustable stop means comprising said pointer and a movable member having an abutment member projecting upwardly therefrom into position to be engaged by said pointer, with means for securing said movable member in adjusted position relative to said dial.

9. A combination according to claim 8, said movable member being rotatable about said shaft portion between said sleeve and said top handle portion.

10. A combination according to claim 9, said dial having a marginal skirt portion, and said means for securing said movable member in adjusted position comprising clamp means engaging said skirt portion.

11. A combination according to claim 8, said shaft portion having an offset crank portion abutting the lower end of said sleeve, which, together with said top handle section, secures said handle against displacement from said sleeve.

12. A material distributing device of the type comprising a wheeled hopper having an agitator therein and a plurality of discharge ports along the bottom thereof with gate means movable laterally of the exterior of said hopper for covering and uncovering said ports and means for moving the same, particularly characterized in that said hopper bottom is curved with said ports located in the curved portion thereof, and in that said gate means comprises a correspondingly curved and ported body portion and a distributing lip extending downwardly and rearwardly from the forward edge thereof into underlying relation to said ports, said gate means being slotted laterally at the junction of said body and lip portions, and said hopper comprising a strap means extending into the so formed slots and supporting the forward edge of said gate means in close contact with said hopper bottom.

References Cited in the file of this patent

UNITED STATES PATENTS

| | | |
|---|---|---|
| 817,436 | Muir | Apr. 10, 1906 |
| 1,888,821 | Fearn | Nov. 22, 1932 |
| 2,318,064 | Delaney | May 4, 1943 |
| 2,513,810 | Masters | July 4, 1950 |
| 2,678,145 | Juzwiak et al. | May 11, 1955 |
| 2,735,582 | Wilson | Feb. 21, 1956 |